United States Patent Office 3,475,395
Patented Oct. 28, 1969

3,475,395
CATALYST COMPOSITIONS, POLYMER-
IZATION PROCESS, AND PRODUCTS
PRODUCED THEREBY
Henry L. Hsieh, Bartlesville, Okla., assignor to Phillips
Petroleum Company, a corporation of Delaware
No Drawing. Filed Dec. 7, 1964, Ser. No. 416,607
Int. Cl. C08g 23/06, 23/14; C08f 1/46
U.S. Cl. 260—88.7                                18 Claims

ABSTRACT OF THE DISCLOSURE

Copolymers of certain alkene oxides and copolymerizable monomers containing a vinyl group are prepared by contacting the monomer system with a catalyst which forms on mixing (1) a compound selected from the group consisting of certain organozinc and organoaluminum compounds and (2) a compound selected from the group consisting of iron, cobalt, nickel, and molybdenum salts and reaction products of these salts with a compound selected from the group consisting of ammonia, amines, and amides.

This invention relates to catalyst compositions, a polymerization process, and the products produced thereby. In a further aspect, this invention relates to the production of polymers of epoxyalkanes with comonomers and to the production of polymers prepared solely from conjugated dienes.

The following are objects of this invention.

An object of my invention is to provide new catalyst compositions.

A further object of my invention is to provide a new polymerization process for the production of polymers of epoxyalkanes with certain comonomers and for the production of polymers prepared solely from conjugated dienes.

Other objects and advantages of this invention will be apparent to one skilled in the art upon reading this disclosure.

Broadly, the invention resides in a process for preparing copolymers of alkene oxides and copolymerizable monomers containing a vinyl group and polymers prepared solely from conjugated dienes comprising contacting the monomer system with a catalyst which forms on mixing (1) a compound selected from the group consisting of organozinc and organoaluminum compounds of the formula $R_2Zn$, $R_3Al$, $RAlX_2$, $R_2AlX$, and $R_3Al_2X_3$

EXAMPLE III where R is selected from the group consisting of saturated aliphatic, saturated cycloaliphatic and aromatic radicals containing 1 to 20 carbon atoms, and X is halogen and (2) a compound selected from the group consisting of iron, cobalt, nickel, and molybdenum salts and reaction products of these salts with a compound selected from the group consisting of ammonia, amines, and amides, said component (2) being the reaction product of an iron salt with an N,N-dimethylamide of a fatty acid when the monomer system contains only conjugated dienes.

Examples of the organozinc and organoaluminum compounds which are suitable include dimethylzinc, diethylzinc, di-n-propylzinc, diisopropylzinc, di-n-butylzinc, di-isobutylzinc, di-n-amylzinc, the diisoamylzincs, di-n-hexylzinc, di-n-octylzinc, di-n-dodecylzinc, dicyclopentylzinc, dicyclohexylzinc, 2,5-dimethylcyclopentylzinc, 3,5-dimethylcyclohexylzinc, diphenylzinc, the ditolylzincs, the dixylylzincs, di(2-hexyltetradecyl)zinc, di(4-cyclohexyloctyl)zinc, di(2-butylcyclohexyl)zinc, di(2,4,8-trimethylhendecyl)zinc, di(7-pentyltetradecyl)zinc, di[2-(2,3,5-tributylphenyl)ethyl]zinc, dibenzylzinc, di(4,6-dicyclopentyldecyl)zinc, methylethylzinc, ethylisopropylzinc, n-propyl-n-hexylzinc, trimethylaluminum, triethylaluminum, tri-n-propylaluminum, triisopropylaluminum, tri-n-butylaluminum, tricyclohexylaluminum, triphenylaluminum, tribenzyl-aluminum, dimethylaluminum fluoride, diethylaluminum fluoride, diethylaluminum chloride, diisobutylaluminum chloride, di-n-octylaluminum chloride, dimethylaluminum bromide, diethylaluminum bromide, diethylaluminum iodide, diisobutylaluminum iodide, methylaluminum difluoride, ethylaluminum difluoride, n-propylaluminum difluoride, octylaluminum difluoride, methylaluminum dichloride, ethylaluminum dichloride, isobutylaluminum dichloride, phenylaluminum dichloride, methylcyclohexylaluminum dichloride, methylaluminum diiodide, isobutylaluminum diiodide, methylaluminum sesquifluoride, ethylaluminum sesquichloride, n-propylaluminum sesquichloride, methylaluminum sesquibromide, ethylaluminum sesquiiodide, etc.

The second component used for preparing the catalyst is the compound of iron, cobalt, nickel, or molybdenum. Examples of suitable compounds of these metals include the chlorides, bromides, iodides, oxyhalides, cyanides, thiocyanates, and salts of fatty acids such as acetates, butyrates, octoates, laurates, stearates, and the like.

Specific examples include ferrous chloride, ferric chloride, ferric bromide, ferrous iodide, ferric oxychloride, ferrous thiocyanate, ferric thiocyanate, ferrous acetate, ferric acetate, ferric butyrate, ferrous octoate, ferric laurate, ferrous stearate, cobaltous chloride, cobaltic chloride, cobaltous bromide, cobaltous iodide, cobaltous cyanide, cobaltous thiocyanate, cobaltous acetate, cobaltic acetate, cobaltous butyrate, cobaltous octoate, cobaltic laurate, cobaltic stearate, nickel chloride, nickel bromide, nickel iodide, nickel cyanide, nickel thiocyanate, nickel acetate, nickel butyrate, nickel octoate, nickel laurate, nickel stearate, molybdenum trichloride, molybdenum pentachloride, molybdenum tetrabromide, molybdenum pentaiodide, molybdenum dioxydibromide, molybdenum oxytrichloride, molybdenum trioxyhexachloride, molybdenum trithiocyanate, molybdenum acetate, molybdenum butyrate, molybdenum octoate, molybdenum laurate, molybdenum stearate.

Reaction products of these compounds with ammonia, amines, and amides can also be employed and are frequently preferred. For example, a cobaltous or nickelous compound when reacted with ammonia, a primary, secondary, or tertiary amine, or an amide, particularly an N,N-disubstituted fatty acid amide, provides a very satisfactory component for preparing a catalyst. Ferric and molybdenum compounds complexed with N,N-disubstituted fatty acid amides are also suitable. Illustrative of the fatty acid amides useful for this purpose are the N,N-dimethylamides of $C_6$ to $C_{20}$ saturated and unsaturated fatty acids marketed by C. P. Hall Company and designated as Hallcomids. Specific examples of the foregoing types of materials which can be used in the catalyst preparation include reaction products of cobaltous chloride with pyridine, nickelous chloride with pyridine, cobaltous chloride with ammonia, cobaltous chloride with N,N-methylcaproamide, cobaltous chloride with N,N-dimethylcaprylamide, nickelous chloride with N,N-dimethylcapramide, nickelous chloride with N,N-dimethyllauramide, nickelous chloride with N,N-dimethylmyristamide, nickelous chloride or cobaltous chloride with a mixture of two or more of the N,N-dimethyl fatty acid amides, and molybdenum pentachloride or ferric chloride with any of the foregoing amides. Other amides include N,N-dimethylpalmitamide, N,N-dimethylstearamide, N,N-dimethyloleamide, and N,N-dimethyllinoleamide.

The mole ratio of organometallic compounds to the iron, cobalt, nickel or molybdenum compound in the catalyst composition can vary over a broad range, i.e., from 1:1 to 50:1.

The catalyst level is ordinarily based on the organometallic component, i.e., the organoaluminum or organozinc compound. It will generally be in the range of one to 100 millimoles per 100 grams monomers, preferably in the range of 5 to 40 millimoles per 100 grams monomers.

Polymerization temperature is usually in the range of −100 to 250° F. Preferred temperature is in the range of 0 to 200° F.

Thus, it is apparent that a number of different monomer systems can be used. Also, a number of different catalysts are possible.

Epoxyalkanes polymerized in accordance with the process of this invention are compounds generally containing from 2 to 20 carbon atoms per molecule. They can be represented by the formula

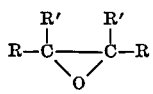

wherein the R and R′ groups can be hydrogen or aliphatic, cycloaliphatic, or aromatic radicals, or the R′ groups can be joined to form a cycloaliphatic ring structure. Illustrative of these compounds are the following: ethylene oxide, propylene oxide (1,2-epoxypropane), 1,2-epoxybutane, 1,2-epoxy-2-methylpropane, 2,3-epoxybutane, 1,2-epoxyhexane, 5-phenyl-2,3-epoxypentane, 3,4-epoxy-n-octane, 2,4,4-trimethyl-1,2-epoxypentane, 4,5-epoxydecane, styrene oxide, 1,4-diphenyl-2,3-epoxybutane, 7 - (4 - tolyl) - 1,2 - epoxyheptane, 4 - cyclohexyl-1,2 - epoxytetradecane, epoxycyclopentane, epoxycyclohexane, and the like.

The comonomer used can be selected from a number of different groups and each of these is discussed separately. Obviously, the properties of the final product depend, at least in part, on the particular comonomer used. Mixtures of epoxyalkanes and mixtures of comonomers can be used.

COPOLYMERS WITH 1-OLEFINS 1-olefins preferred as comonomers with epoxyalkanes contain from 2 to 8 carbon atoms per molecule and include the following: ethylene, propylene, 1-butene, isobutene, 1-pentene, 3-methyl-1-butene, 1-hexene, 3-methyl-1-pentene, 4-methyl-1-pentene, 1-octene, 3,4-dimethyl-1-pentene, 3-ethyl-1-pentene, 4-ethyl-1-hexene, and the like.

The 1-olefin is generally employed in an amount in the range from 5 to 80 parts by weight per 100 parts by weight total monomers but amounts can be outside this range if desired. The monomer ratio is adjusted to give the type of product desired. When the two monomers are 1,2-epoxypropane and isobutene, rubbery products are obtained when the major amount of the monomer mixture is 1,2-epoxypropane. Softer products are obtained as the proportion of isobutene is increased.

The products from this system range from viscous liquids to rubbers. The rubbery copolymers are suitable for use as specialty products where low temperature flexibility and good ozone resistance are needed.

COPOLYMERS WITH CONJUGATED DIENES

Conjugated dienes preferred as comonomers with epoxyalkanes to produce copolymers as herein described contain from 4 to 12 carbon atoms per molecule and include 1,3-butadiene, isoprene, 1,3-pentadiene, 2,3-dimethyl-1,3-butadiene, 1,3-octadiene, 1,3-dodecadiene, chloroprene, 2-methoxy-1,3-butadiene, etc.

While the monomer ratio can vary over a broad range, it is preferred that the conjugated diene be employed in an amount of at least 4 parts by weight per 100 parts by weight of total monomers in order that the copolymer will be readily vulcanizable. It is to be understood that smaller amounts of the conjugated diene can be employed if desired. The upper limit of conjugated diene is regulated to give a product with whatever properties are desired and will generally not exceed 96 parts by weight per 100 parts by weight of total monomers.

The products from this system range from viscous liquids to rubbers. Since the copolymers contain appreciable amounts of unsaturation, they are readily vulcanizable with sulfur, various types of sulfur compounds, and other agents well known in the rubber vulcanization art.

COPOLYMERS WITH UNSATURATED NITRILES

Another group of comonomers includes unsaturated nitriles such as acrylonitrile and methacrylonitrile.

In order to obtain rubbery copolymers, the epoxyalkane is employed in major amount. The quantity of epoxyalkane is generally in the range of 60 to 95 parts by weight per 100 parts by weight of total monomers charged and the quantity of unsaturated nitrile is in the range of 40 to 5 parts by weight per 100 parts by weight of total monomers charged. The type of product obtained, i.e., liquid, rubbery, or resinous, will depend upon the amount of unsaturated nitrile in the copolymer and the conditions and catalyst used for polymer preparation.

The products containing the nitrile group range from viscous liquids to hard rubbers and resins. The presence of the nitrile group increases the oil resistance of the polymers. They also have excellent ozone resistance, heat resistance, and low temperature flexibility.

HOMOPOLYMERS OF CONJUGATED DIENES

Conjugated dienes polymerized in accordance with the present process to produce homopolymers are preferably those containing from 4 to 12 carbon atoms per molecule and include 1,3-butadiene, isoprene, 1,3-pentadiene, 2,3-dimethyl-1,3-butadiene, 1,3-hexadiene, 1,3-dodecadiene, chloroprene, 2-methoxy-1,3-butadiene, etc. If desired, mixtures of two or more conjugated dienes can be employed.

In order to be effective as catalysts, or initiators, for the polymerization of conjugated dienes alone, it is generally necessary that the catalyst possess some measure of solubility in the diluent employed for the polymerization. A narrower group of catalysts, based on the iron salts are used for this polymerization. Ferric chloride is not soluble to any extent in the hydrocarbons, but if it is brought into contact with an N,N-disubstituted fatty acid amide such as the Hallcomid products described above, a hydrocarbon-soluble product is formed. When this product is blended with an organozinc or organoaluminum compound as set forth above, an active initiator for the polymerization of conjugated dienes is produced.

The mole ratio of organometallic compound to ferric chloride can vary over a broad range, i.e., from 3:1 to 50:1, preferably from 5:1 to 30:1.

The catalyst level is ordinarily based on the organometallic component, i.e., the organoaluminum or organozinc compound. It will generally be in the range of one to 100 millimoles per 100 grams monomer, preferably in the range of 5 to 40 millimoles per 100 grams monomer.

The diene products are high molecular weight, rubbery polymers. Polybutadiene produced by this process contains less than 10 percent trans-1,4-addition, 25 to 35 percent 1,2-addition (vinyl), and 58 to 72 percent cis-1,4-addition polymer. Polyisoprene contains 35 to 45 percent 3,4-addition, the remainder being predominantly cis polymer.

The following examples illustrate specific embodiments of the invention. They should not be considered unduly limiting.

Example I 1,2-epoxypropane was copolymerized with isobutene in a series of runs in the presence of a catalyst formed on mixing triisobutylaluminum with a complex of cobaltous chloride and an N,N-dimethylamide derived from a mixture of $C_6$ to $C_{12}$ fatty acids (Hallcomid M 8–10, C. P. Hall Co.). Approximate composition of the N,N-dimethylamide was as follows:

| | Percent |
|---|---|
| N,N-dimethylcaproamide | 5 |
| N,N-dimehtylcaprylamide | 50 |
| N,N-dimethylcapramide | 40 |
| N,N-dimethyllauramide | 5 |

The following polymerization recipe was used:

| | |
|---|---|
| 1,2-epoxypropane, parts by weight | Variable |
| Isobutene, parts by weight | Variable |
| Triisobutylaluminum, mhm. | 30 |
| Cobalt chloride·amide complex [1], mhm. | 1 |
| Toluene, parts by weight | 430 |
| Temperature, ° F. | 41 |
| Time, hours | 16 |

[1] One mole of $CoCl_2$ was dissolved in 4 moles of the N,N-dimethylamide and the mixture was then diluted with toluene to make a 0.5 M solution.

Toluene was charged first and the reactor was then purged with nitrogen. The monomers were added followed by the triisobutylaluminum and finally the cobalt chloride-amide complex compound. At the conclusion of the polymerization each reaction mixture was poured into an excess of water to inactivate and remove the catalyst, the aqueous layer was separated, approximately one part by weight per 100 weight parts polymer of 2,2′-methylene-bis(4-methyl-6-tert-butylphenol) was added to the hydrocarbon solution of the polymer, and the product was recovered by evaporation of the solvent. Results are presented in the following table.

| | 1,2-epoxy-propane/isobutene, wt. ratio | Conv., Percent | Inh. visc.[3] | Gel, Percent[4] | Type of Product |
|---|---|---|---|---|---|
| Run: | | | | | |
| 1 | 90/100 | 98 | 0.72 | 0 | Soft rubbery solid. |
| 2 | 70/30 | 82 | 0.62 | 0 | Very soft solid. |
| 3 | 30/70 | 43 | 0.34 | 0 | Semisolid. |
| 4 | 100/0 | [1] 0 | | | |
| 5 | 100/0 | [2] 18 | | | |

[1] No conversion after 48 hours.
[2] Temperature was 158° F.
[3] One tenth gram of polymer was placed in a wire cage made from 80 mesh screen and the cage was placed in 100 ml. of toluene contained in a wide-mouth, 4-ounce bottle. After standing at room temperature (approximately 25° C.) for 24 hours, the cage was removed and the solution was filtered through a sulfur absorption tube of grade C porosity to remove any solid particles present. The resulting solution was run through a Medalia-type viscometer supported in a 25° C. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the solube portion of the original sample.
[4] Determination of gel was made along with the inherent viscosity determination. The wire cage was calibrated for toluene retention in order to correct the weight of swelled gel and to determine accurately the weight of dry gel. The empty cage was immersed in toluene and then allowed to drain three minutes in a closed wide-mouth, two-ounce bottle. A piece of folded quarter-inch hardware cloth in the bottom of the bottle supported the cage with minimum contact. The bottle containing the cage was weighed to the nearest 0.02 gram, during a minimum three-minute draining period after which the cage was withdrawn and the bottle again weighed to the nearest 0.02 gram. The difference in the two weighings is the weight of the cage plus the toluene retained by it, and by subtracting the weight of the empty cage from this value, the weight of toluene retention is found, i.e., the cage calibration. In the gel determination, after the cage containing the sample had stood for 24 hours in toluene, the cage was withdrawn from the bottle with the aid of forceps and placed in the two-ounce bottle. The same procedure was followed for determining the weight of swelled gel as was used for calibration of the cage. The weight of swelled gel was corrected by subtracting the cage calibration.

The data show that the isobutene served as a promoter as well as a comonomer and that product characteristics can be varied by varying the monomer ratio. In the absence of isobutene, no conversion was obtained at 41° F. and the conversion reached only 18 percent when the temperature was increased to 158° F.

Example II

The recipe of Example I was used for the copolymerization of 1,2-epoxypropane and isobutene except that a molybdenum pentachloride·Hallcomid complex was used in place of the cobaltous chloride·Hallcomid complex. The procedure was the same as in the foregoing example. Results are presented in the following table.

| | 1,2-epoxypropane isobutene, Wt. ratio | Conv., percent | Inh. visc. | Insolubles, percent | Type of Product |
|---|---|---|---|---|---|
| Run: | | | | | |
| 1 | 90/10 | 98 | 0.63 | 0 | Very soft solid. |
| 2 | 70/30 | 85 | 0.60 | 0 | Do. |
| 3 | 30/70 | 45 | 0.42 | 0 | Semisolid. |

These data show that the molybdenum pentachloride·amide complex gave results similar to those obtained with the cobaltous chloride·amide complex used in Example I.

Example III

Butadiene was copolymerized with 1,2-epoxypropane in the presence of a catalyst system formed on mixing triisobutylaluminum or ethylaluminum sesquichloride with a complex of nickelous or cobaltous chloride and pyridine or cobaltous octoate. The following recipe was employed:

| | |
|---|---|
| 1,2-epoxypropane, parts by weight | 80 |
| 1,3-butadiene, parts by weight | 20 |
| Toluene, parts by weight | 430 |
| Triisobutylaluminum or ethylaluminum sesquichloride, mhm. | 30 |
| Nickel or cobalt compound, mhm. | Variable |
| Temperature, ° F. | 158 |
| Time, hours | Variable | m.h.m.=Millimoles per 100 grams monomers.

Toluene was charged first and the reactor was then purged with nitrogen. 1,2-epoxypropane was added followed by the butadiene, then the triisobutylaluminum, and finally the complex compound of cobaltous or nickelous chloride with pyridine (prepared by the method of Cox et al., J. Chem. Soc. 1937, 1956). At the conclusion of the polymerization the reactions were shortstopped with 2,2′-methylene-bis(4-methyl-6-tert-butylphenol) dissolved in a mixture containing equal parts by volume of isopropyl alcohol and toluene. The amount of solution used was sufficient to provide approximately 0.5 part by weight of the phenolic antioxidant per 100 parts by weight copolymer. The reaction mixture was then poured into water and agitated to wash out catalyst residues, the aqueous layer was separated, and the diluent was removed from the polymer by evaporation. Results of the runs are presented in the following table.

| Run No.: | Al compound | Co or Ni compound | | Time, hrs. | Conv., percent | Inh. visc. | Gel, percent | Unsaturation Mmoles ICl/g. polymer |
|---|---|---|---|---|---|---|---|---|
| | | Type | Mhm. | | | | | |
| 1 | EASC | Co(OOC₈H₁₇)₂ | 2 | 48 | 36 | 0.83 | 0 | 1.55 |
| 2 | EASC | Co(OOC₈H₁₇)₂ | 3 | 48 | 38 | | | |
| 3 | EASC | Co(OOC₈H₁₇)₂ | 4.3 | 48 | 41 | 0.84 | 0 | 0.96 |
| 4 | EASC | Co(OOC₈H₁₇)₂ | 6 | 48 | 43 | | | |
| 5 | EASC | Co(OOC₈H₁₇)₂ | 10 | 48 | 52 | 0.58 | 0 | 0.97 |
| 6 | EASC | CoCl₂·(Py)₂ | 2 | 48 | 48 | | | |
| 7 | EASC | CoCl₂·(Py)₂ | 3 | 48 | 52 | | | |
| 8 | EASC | CoCl₂·(Py)₂ | 4.3 | 48 | 56 | | | |
| 9 | EASC | CoCl₂·(Py)₂ | 6 | 48 | 63 | 0.30 | 0 | 1.28 |
| 10 | EASC | CoCl₂·(Py)₂ | 10 | 48 | 70 | | | |
| 11 | TBA | NiCl₂·(Py)₂ | 2 | 16 | 18 | | | |
| 12 | TBA | NiCl₂·(Py)₂ | 3 | 16 | 18 | 0.17 | 0 | |
| 13 | TBA | NiCl₂·(Py)₂ | 4.3 | 16 | 12 | 0.07 | 0 | |
| 14 | TBA | NiCl₂·(Py)₂ | 6 | 16 | 15 | 0.29 | 0 | |
| 15 | TBA | CoCl₂·(Py)₂ | 2 | 16 | 40 | 0.17 | 0 | |
| 16 | TBA | CoCl₂·(Py)₂ | 3 | 16 | 45 | | | |
| 17 | TBA | CoCl₂·(Py)₂ | 4.3 | 16 | 42 | 0.11 | 0 | |
| 18 | TBA | CoCl₂·(Py)₂ | 6 | 16 | 40 | | | |

EASC = Ethylaluminum sesquichloride.
TBA = Triisobutylaluminum.
Py = Pyridine.

The copolymers obtained ranged from viscous liquids to semisolids, depending upon inherent viscosity. Infrared analyses showed the presence of

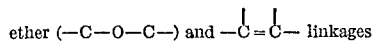

ether (—C—O—C—) and —C=C— linkages

Products containing unsaturation are vulcanizable with sulfur.

Example IV

A series of runs was made for the copolymerization of 1,2-epoxypropane with butadiene using variable monomer ratios. Polymerization was carried out in the presence of a catalyst system formed on mixing triisobutylaluminum with a reaction product of cobaltous chloride and an N,N-dimethylamide derived from a mixture of $C_6$ to $C_{12}$ fatty acids (Hallcomid M 8–10, C. P. Hall Co.). Approximate composition in the N,N-dimethylamide is given in Example I. The following polymerization recipe was used:

1,2-epoxypropane, parts by weight _____ Variable
1,3-butadiene, parts by weight _____ Variable
Cyclohexane, parts by weight _____ 380
Triisobutylaluminum, mhm. _____ 30
CoCl₂·(Hallcomid)₄, mhm. _____ 2
Temperature, °F. _____ 158
Time, hours _____ 48

The procedure was essentially that described in Example I. The cobaltous chloride·Hallcomid complex was prepared by dissolving anhydrous cobaltous chloride in the N,N-dimethylamide. This material was diluted with toluene prior to charging it to the polymerization mixture. Monomer ratios and conversion data are presented in the following table:

| Run: | Epoxypropane Bd, weight ratio | Conversion, percent |
|---|---|---|
| 1 | 80/20 | 82 |
| 2 | 60/40 | 82 |
| 3 | 40/60 | 72 |
| 4 | 20/80 | 70 |

Bd equals butadiene.

The copolymers ranged from a soft solid in run 1 to a viscous liquid in run 4. They were completely soluble in acetone and isopropyl alcohol.

Example V

Isoprene was copolymerized with 1,2-epoxypropane using a catalyst system formed on mixing triisobutylaluminum with a complex of cobaltous chloride and an N,N-dimethylamide (Hallcomid M 8–10). Two series of runs were made in which the monomer ratio was varied. Polymerization was carried out in either toluene or cyclohexane. Temperature was 158° F. and time was 48 hours. The recipe was as follows:

1,2-epoxypropane, parts by weight _____ Variable
Isoprene, parts by weight _____ Variable
Diluent, parts by weight _____ Variable
Triisobutylaluminum, mhm. _____ 30
CoCl₂·(Hallcomid)₄, mhm. _____ 12

The procedure was essentially that described in Example I. Results are presented in the following table:

| Run No.: | Diluent | | Epoxy propane/MBd, weight ratio | Conv., percent |
|---|---|---|---|---|
| | Type | Parts by weight | | |
| 1 | Toluene | 430 | 80/20 | 58 |
| 2 | do | 430 | 60/40 | 61 |
| 3 | do | 430 | 40/60 | 36 |
| 4 | do | 430 | 20/80 | 45 |
| 5 | Cyclohexane | 390 | 80/20 | 89 |
| 6 | do | 390 | 60/40 | 80 |
| 7 | do | 390 | 40/60 | 78 |
| 8 | do | 390 | 20/80 | 95 |

MBd equals isoprene.

The copolymer products were liquids. Infrared analyses showed the presence of

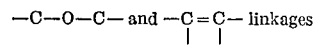

—C—O—C— and —C=C— linkages

Example VI

Runs were carried out in which 1,2-epoxypropane was copolymerized with butadiene, isoprene, or chloroprene using a weight ratio of 95 parts of epoxypropane and 5 parts of conjugated diene. The diluent was toluene, 430 parts by weight per 100 parts by weight monomers. Various catalyst systems were employed that were formed on mixing either triisobutylaluminum (TBA) or ethylaluminum sesquichloride (EASC) with cobalt octoate or a complex of cobaltous chloride with an N,N-dimethylamide (Hallcomid M 8–10). Polymerization temperature was 158° F. and the time was 48 hours. The procedure was the same as described in Example I. Results are summarized in the following table.

| Run No. | Conjugated diene | Al compound Type | Mhm. | Co or Ni compound Type | Mhm. | Conv., percent | Inh. visc. | Unsaturation, Mmoles ICl/g, polyme. |
|---|---|---|---|---|---|---|---|---|
| 1 | Butadiene | TBA | 30 | Co(OC₈H₁₇)₂ | 2 | 50 | | |
| 2 | do | TBA | 30 | Co(OC₈H₁₇)₂ | 10 | 48 | 1.00 | 0.62 |
| 3 | do | EASC | 15 | Co(OC₈H₁₇)₂ | 2 | 30 | 0.73 | |
| 4 | do | EASC | 15 | Co(OC₈H₁₇)₂ | 10 | 35 | 0.06 | |
| 5 | do | TBA | 30 | CoCl₂·(Hal.)₄ | 2 | 58 | 0.22 | |
| 6 | do | TBA | 30 | CoCl₂·(Hal.)₄ | 10 | 58 | 0.12 | 0.75 |
| 7 | do | EASC | 15 | CoCl₂·(Hal.)₄ | 2 | 30 | 0.28 | 0.36 |
| 8 | do | EASC | 15 | CoCl₂·(Hal.)₄ | 10 | 50 | 0.48 | 0.76 |
| 9 | Chloroprene | TBA | 30 | Co(OC₈H₁₇)₂ | 2 | 35 | 0.80 | 0.50 |
| 10 | do | TBA | 30 | Co(OC₈H₁₇)₂ | 10 | 35 | 0.19 | 0.56 |
| 11 | do | TBA | 30 | CoCl₂·(Hal.)₄ | 2 | 55 | 0.24 | |
| 12 | do | TBA | 30 | CoCl₂·(Hal.)₄ | 10 | 45 | 0.33 | 0.66 |
| 13 | do | EASC | 15 | CoCl₂·(Hal.)₄ | 10 | 28 | 0.39 | 0.57 |
| 14 | Isoprene | TBA | 30 | Co(OC₈H₁₇)₂ | 2 | 35 | 0.91 | 0.61 |
| 15 | do | TBA | 30 | Co(OC₈H₁₇)₂ | 10 | 40 | 1.42 | 0.63 |
| 16 | do | EASC | 15 | Co(OC₈H₁₇)₂ | 2 | 20 | 0.67 | |
| 17 | do | EASC | 15 | Co(OC₈H₇₇)₂ | 10 | 25 | 0.32 | |
| 18 | do | TBA | 30 | CoCl₂·(Hal.)₄ | 2 | 60 | 0.86 | 0.44 |
| 19 | do | TBA | 30 | CoCl₂·(Hal.)₄ | 10 | 70 | 1.75 | 0.53 |
| 20 | do | EASC | 15 | CoCl₂·(Hal.)₄ | 2 | 35 | 0.75 | |
| 21 | do | EASC | 15 | CoCl₂·(Hal.)₄ | 10 | 70 | 0.63 | |

The products ranged from viscous liquids to semisolids depending upon inherent viscosity. As can be seen from the data, the copolymers contained a considerable amount of unsaturation, thus making them sulfur vulcanizable.

Example VIII

Runs were carried out for the copolymerization of 1,2-epoxypropane with butadiene using a weight ratio of 90 parts of epoxypropane and 10 parts by weight of butadiene. Diluents were toluene and cyclohexane. The catalyst was formed on mixing triisobutylaluminum with a complex of cobaltous chloride and an N,N-dimethylamide (Hallcomid M 8-10). In all runs the amount of triisobutylaluminum charged was 30 millimoles per 100 grams monomers. The cobalt complex compound was varied. Polymerization temperature was 158° F. and the time was 48 hours. Results are presented in the following table.

acrylonitrile with 1,2-epoxypropane in the presence of a catalyst system formed on mixing triisobutylaluminum with a reaction product of cobaltous chloride or ferric chloride with an N,N-dimethyl fatty acid amide derived from a mixture of $C_6$ to $C_{12}$ fatty acids (Hallcomid M 8-10). The Hallcomid complex compounds were prepared by dissolving the anhydrous chloride in the N,N-dimethylamide in a one to four mole ratio. The reaction mixture was diluted with toluene to make a 0.5 molar solution.

The diluent was charged first after which the reactor was purged with nitrogen. 1,2-epoxypropane was added followed by the triisobutylaluminum and then the metal halide/amide reaction product. At the conclusion of the polymerization each reaction mixture was shortstopped with dilute hydrochloric acid, poured ito water, and the organic and aqueous phases were separated. The organic

| Run No. | Diluent Type | phm. | CoCl₂·(Hal.)₄, mhm. | Conv., percent | Gel, percent | Inh. visc. | Unsaturation Mmoles ICl/g, polymer |
|---|---|---|---|---|---|---|---|
| 1 | Toluene | 430 | 3 | 92 | 0 | 0.020 | 0.93 |
| 2 | do | 430 | 5 | 100 | 0 | 0.13 | 0.90 |
| 3 | do | 430 | 10 | 100 | 0 | 0.16 | |
| 4 | do | 430 | 15 | 84 | 0 | 0.11 | |
| 5 | Cyclohexane | 390 | 3 | 93 | 0 | 0.18 | 0.75 |
| 6 | do | 390 | 5 | 94 | 0 | 0.15 | 0.72 |
| 7 | do | 390 | 10 | 100 | 0 | 0.09 | |
| 8 | do | 390 | 15 | 85 | 0 | 0.09 | | phm.=Parts by weight per 100 parts by weight monomers.

High conversions were obtained in all the runs. The products were viscous liquids that contained a substantial amount of unsaturation.

Example VIII

A series of runs was made for the copolymerization of phase was washed with water to remove acid, approximately one part by weight per 100 parts of polymer of 2,2' - methylene - bis(4 - methyl-6-tert-butylphenol) was added, and the polymer was recovered by evaporation of the diluent. Results are presented in the following table.

| | Run | | | | | | |
|---|---|---|---|---|---|---|---|
| | 1 | 2 | 3 | 4 | 5 | 6 | 7 |
| Propylene oxide, parts by weight | 90 | 90 | 70 | 70 | 70 | 70 | 70 |
| Acrylonitrile, parts by weight | 10 | 10 | 30 | 30 | 30 | 30 | 30 |
| Cyclohexane, parts by weight | 380 | 380 | 380 | 390 | 390 | 390 | 390 |
| Triisobutylaluminum, mhm | 30 | 30 | 30 | 30 | 30 | 30 | 30 |
| CoCl₂'(Hallcomid)⁴, mhm | 2 | 2 | 2 | 1 | 3 | | |
| FeCl₃'(Hallcomid)⁴, mhm | | | | | | 2 | 3 |
| Temperature, °F | 158 | 41 | 41 | 41 | 41 | 41 | 41 |
| Time, hours | 48 | 48 | 48 | 48 | 48 | 48 | 48 |
| Conversion, percent | 20 | 32 | 64 | 65 | 50 | 28 | 25 |
| Inherent viscosity [1] | 0.28 | 0.20 | 0.33 | 0.28 | 0.32 | 1.06 | 1.10 |
| Insoluble matter, percent [2] | 0 | 13 | 10 | 20 | 57 | 59 | 57 |
| Product | [3] | [4] | [5] | [4] | [6] | [6] | [6] |

[1] Determined on soluble portion of sample.
[2] Insoluble in toluene at 25° C.; insoluble matter contained copolymer with high acrylonitrile content and some acrylonitrile homopolymer.
[3] Sticky solid.
[4] Rubber.
[5] Soft rubber.
[6] Resin.

All polymers, except that from Run 1, contained a considerable portion of material that was insoluble in toluene at 25° C. It had a high acrylonitrile content. The soluble polymers were examined by infrared analysis and found to contain —C—O—C— and —C≡N groups.

Example IX

Runs were made in which butadiene and isoprene were each polymerized in the presence of a catalyst formed on mixing triisobutylaluminum with a complex of ferric chloride and an N,N-dimethylamide derived from a mixture of $C_6$ to $C_{12}$ fatty acids (Hallcomid M 8–10). Polymerization recipes were as presented in the following table.

|  | A | B | C | D |
|---|---|---|---|---|
| 1,3-butadiene, parts by weight | 100 | 100 | | |
| Isoprene, parts by weight | | | 100 | 100 |
| Toluene, parts by weight | 860 | | 860 | |
| Cyclohexane, parts by weight | | 780 | | 780 |
| Triisobutylaluminum, mhm | 20 | 20 | 30 | 30 |
| Ferric chloride.amide complex,[1] mhm | (²) | (²) | (²) | (²) |
| Temperature, °F | 41 | 41 | 41 | 41 |
| Time, hours | 20 | 16 | 20 | 20 |

[1] One mole of $FeCl_3$ was dissolved in 4 moles of the N,N-dimethylamide and the mixture was then diluted with toluene² to make a 0.5 M solution.
² Variable.
mhm = Millimoles per 100 grams monomer.

The diluent was charged first and the reactor was then purged with nitrogen. The monomer was added followed by the triisobutylaluminum and finally the ferric chloride-amide complex compound. At the conclusion of the polymerization the reactions were shortstopped with 2,2'-methylene-bis(4-methyl-6-tertbutylphenol) dissolved in a mixture containing equal parts by volume of isopropyl alcohol and toluene. The amount of solution used was sufficient to provide approximately one part by weight of the phenolic antioxidant per 100 parts by weight polymer. The polymer was then coagulated in isopropyl alcohol, separated and dried. Rubbery products were obtained in all cases. Results of the runs are presented in the following table.

| Run No. | Run from recipe | FeCl³.amide complex, mhm. | Conv., percent | Inh. visc. | Gel, percent | Microstructure, percent | | |
|---|---|---|---|---|---|---|---|---|
| | | | | | | Cis | Trans | Vinyl |
| 1 | A | 1 | 11 | 15.34 | 0 | 69.4 | 0.5 | 30.1 |
| 2 | A | 2 | 11 | 14.98 | 2 | 69.0 | 0.9 | 30.1 |
| 3 | A | 3 | 10 | 15.11 | 7 | 68.9 | 1.1 | 30.0 |
| 4 | A | 4 | 11 | 13.61 | 0 | 63.0 | 6.9 | 30.1 |
| 5 | B | 0.5 | 5 | 17.16 | 0 | 71.3 | 0.5 | 28.2 |
| 6 | B | 1 | 5 | 15.38 | 0 | 70.0 | 0.5 | 29.5 |
| 7 | B | 1.5 | 5 | 14.02 | 0 | 69.6 | 0.5 | 29.9 |
| 8 | B | 2 | 7 | 14.41 | 0 | 69.2 | 0.5 | 30.3 |
| 9 | C | 1 | 5 | | | | | ¹39.5 |
| 10 | C | 2 | 5 | 12.6 | 0 | | | |
| 11 | C | 3 | 5 | 11.9 | 0 | | | |
| 12 | D | 1 | 5 | | | | | ¹40.3 |
| 13 | D | 2 | 5 | 11.4 | 0 | | | |

[1] 3,4-addition; remainder predominantly cis.

The data show that all polymers had a very high inherent viscosity (high molecular weight). Except for run 4 which contained 6.9 percent trans-1,4-addition polymer, the polybutadiene contained from 63 to 71.3 percent cis, 28.2 to 30.3 percent 1,2-addition (vinyl), and from 0.5 to 1.1 percent trans-1,4-addition polymer. The cis:vinyl ratio in these polymers ranges from 2.1:1 in run 4 to 2.5:1 in run 5. The polyisoprene contained about 40 percent of the 3,4-addition polymer, the remainder being predominantly cis.

Samples of certain of the polymer products produced in the runs described in the examples were examined by infrared analysis. This work was carried out in order to determine the percentage of the polymers formed by 1,2-addition of the butadiene. The procedure used in making these determinations is described hereinafter.

The polymer samples were dissolved in carbon disulfide to form a solution having 25 grams of polymer per liter of solution. The infrared spectrum of each of the solutions (percent transmission) was then determined in a commercial infrared spectrometer.

The percent of total unsaturation present as trans 1,4- was calculated according to the following equation and consistent units:

$$\epsilon = \frac{E}{tc}$$

where $\epsilon$ = extinction coefficient (liters-mols⁻¹ centimeters⁻¹); E = extinction (log $I_0/I$); $t$ = path length (centimeters); and $c$ = concentration (mols double bond/liter). The extinction was determined at the 10.35 micron band. The extinction coefficient was 146 (liters-mols⁻¹ centimeters⁻¹).

The percent of the total unsaturation present as 1,2-(vinyl) was calculated according to the above equation, using the 11.0 micron band. The extinction coefficient was 209 (liters-mols⁻¹ centimeters⁻¹).

The percent of the total unsaturation present as cis 1,4- was obtained by subtracting the trans 1,4- and 1,2-(vinyl) determined according to the above procedure, from the theoretical unsaturation, assuming one double bond per each $C_4$ unit in the polymer.

For the determination of the microstructure of polyisoprene solutions containing 25 grams of polymer per liter of solution were prepared. Calibrations were based on deproteinized natural rubber as a reference material, assuming that it contained 98 percent cis and 2 percent 3,4-addition product. The cis was measured at the 8.9 micron band and the 3,4-addition at the 11.25 micron band.

In the polymerization recipes, the term "mhm" is gram millimoles per 100 grams of monomer(s).

Unsaturation was determined by iodine chloride titration as follows: A 0.5 gram sample of polymer was dissolved in a 75/25 volume mixture of carbon disulfide and chloroform, a chloroform solution of iodine chloride of known concentration (approximately 0.09–0.10 molar) was added, the mixture was placed in a 25° C. bath for one hour to allow time for reaction, and the excess of iodine chloride was tritrated with 0.05 N sodium thiosulfate. The millimoles of iodine chloride that reacted with one gram of sample was then calculated.

As many possible embodiments can be made of this invention without departing from the scope thereof, it is to be understood that all matter herein set forth is to be interpreted as illustrative and not as unduly limiting the invention.

I claim:
1. A process for preparing copolymers of alkene oxides represented by the formula

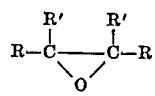

wherein the R and R' groups are hydrogen, or aliphatic, cycloaliphatic, or aromatic radicals, or the R' groups are joined to form a cycloaliphatic ring structure, the total number of carbon atoms being within the range of 2 to 20 per molecule and copolymerizable monomers containing a vinyl group selected from the group consisting of 1-olefins containing from 2 to 8 carbon atoms per molecule, conjugated dienes containing from 4 to 12 carbon atoms per molecule, and unsaturated nitriles comprising contacting the monomers system with a catalyst which forms on mixing (1) a compound selected from the group consisting of organozinc and organoaluminum compounds of the formula $R_2Zn$, $R_3Al$, $RAlX_2$, $R_2AlX$, and $R_3Al_2X_3$ where R is selected from the group consisting of saturated aliphatic, saturated cycloaliphatic, and aromatic radicals containing 1 to 20 carbon atoms, and X is halogen and (2) a compound selected from the group consisting of iron, cobalt, nickel, and molybdenum salts and reaction products of these salts with a compound selected from the group consisting of ammonia, amines, and amides, the mole ratio of component (1) to component (2) being from 1:1 to 50:1, said organometallic compound being used in an amount of 1 to 100 gram millimoles per 100 grams of monomers, and said polymerization being carried out at a temperature of −100 to 250° F.

2. A process which comprises polymerizing 1,3-butadiene with 1,2-epoxypropane in hydrocarbon diluent, using, as catalyst, the composition which forms on mixing (1) triisobutylaluminum with (2) the reaction product of nickelous chloride and pyridine, the mole ratio of component (1) to component (2) being from 1:1 to 50:1, said component (1) being used in an amount of 1 to 100 gram millimoles per 100 grams of monomers, and said polymerization being carried out at a temperature of −100 to 250° F.

3. A process which comprises polymerizing 1,3-butadiene with 1,2-epoxypropane in hydrocarbno diluent using as catalyst, the composition which forms on mixing (1) triisobutylaluminum with (2) the reaction product of cobaltous chloride and pyridine, the mole ratio of component (1) to component (2) being from 1:1 to 50:1, said component (1) being used in an amount of 1 to 100 gram millimoles per 100 grams of monomers, and said polymerization being carried out at a temperature of −100 to 250° F.

4. A process which comprises polymerizing 1,3-butadiene with 1,2-epoxypropane in hydrocarbon diluent using, as catalyst, the composition which forms on mixing (1) ethylaluminum sesquichloride with (2) cobaltous octoate, the mole ratio of component (1) to component (2) being from 1:1 to 50:1, said component (1) being used in an amount of 1 to 100 gram millimoles per 100 grams of monomers, and said polymerization being carried out at a temperature of −100 to 250° F.

5. A process which comprises polymerizing 1,3-butadiene with 1,2-epoxypropane in hydrocarbon diluent using, as catalyst, the composition which forms on mixing (1) ethylaluminum sesquichloride with (2) the reaction product of cobaltous chloride and pyridine, the mole ratio of component (1) to component (2) being from 1:1 to 50:1, said component (1) being used in an amount of 1 to 100 gram millimoles per 100 grams of monomers, and said polymerization being carried out at a temperature of −100 to 250° F.

6. A process which comprises polymerizing 1,3-butadiene with 1,2-epoxypropane in hydrocarbon diluent using, as catalyst, the composition which forms on mixing (1) triisobutylaluminum with (2) the reaction product of cobaltous chloride and an N,N-dimethylamide derived from a mixture of $C_6$ to $C_{12}$ fatty acids, the mole ratio of component (1) to component (2) being from 1:1 to 50:1, said component (1) being used in an amount of 1 to 100 gram millimoles per 100 grams of monomers, and said polymerization being carried out at a temperature of −100 to 250° F.

7. A process which comprises polymerizing isoprene with 1,2-epoxypropane in hydrocarbon diluent using, as catalyst, the composition which forms on mixing (1) triisobutylaluminum with (2) the reaction product of cobaltous chloride and an N,N-dimethylamide derived from a mixture of $C_6$ to $C_{12}$ fatty acids, the mole ratio of component (1) to component (2) being from 1:1 to 50:1, said component (1) being used in an amount of 1 to 100 gram millimoles per 100 grams of monomers, and said polymerization being carried out at a temperature of −100 to 250° F.

8. A process which comprises polymerizing 1,3-butadiene with 1,2-epoxypropane in hydrocarbon diluent using, as catalyst, the composition which forms on mixing (1) triisobutylaluminum with (2) cobaltous octoate, the mole ratio of component (1) to component (2) being from 1:1 to 50:1, said component (1) being used in an amount of 1 to 100 gram millimoles per 100 grams of monomers, and said polymerization being carried out at a temperature of −100 to 250° F.

9. A process which comprises polymerizing 1,3-butadiene with 1,2-epoxypropane in hydrocarbon diluent using, as catalyst, the composition which forms on mixing (1) ethylaluminum sesquichloride with (2) the reaction product of cobaltous chloride and an N,N-dimethylamide derived from a mixture of $C_6$ to $C_{12}$ fatty acids, the mole ratio of component (1) to component (2) being from 1:1 to 50:1, said component (1) being used in an amount of 1 to 100 gram millimoles per 100 grams of monomers, and said polymerization being carried out at a temperature of −100 to 250° F.

10. A process which comprises polymerizing chloroprene with 1,2-epoxypropane in hydrocarbon diluent using, as catalyst, the composition which forms on mixing (1) triisobutylaluminum with (2) cobaltous octoate, the mole ratio of component (1) to component (2) being from 1:1 to 50:1, said component (1) being used in an amount of 1 to 100 gram millimoles per 100 grams of monomers, and said polymerization being carried out at a temperature of −100 to 250° F.

11. A process which comprises polymerizing chloroprene with 1,2-epoxypropane in hydrocarbon diluent using, as catalyst, the composition which forms on mixing (1) ethylaluminum sesquichloride with (2) the reaction product of cobaltous chloride and an N,N-dimethylamide derived from a mixture of $C_6$ to $C_{12}$ fatty acids, the mole ratio of component (1) to component (2) being from 1:1 to 50:1, said component (1) being used in an amount of 1 to 100 gram millimoles per 100 grams of monomers, and said polymerization being carried out at a temperature of −100 to 250° F.

12. A process which comprises polymerizing isoprene with 1,2-epoxypropane in hydrocarbon diluent using, as catalyst, the composition which forms on mixing (1) triisobutylaluminum with (2) cobaltous octoate, the mole ratio of component (1) to component (2) being from 1:1 to 50:1, said component (1) being used in an amount of 1 to 100 gram millimoles per 100 grams of monomers, and said polymerization being carried out at a temperature of −100 to 250° F.

13. A process which comprises polymerizing isoprene with 1,2-epoxypropane in hydrocarbon diluent using, as catalyst, the composition which forms on mixing (1) ethylaluminum sesquichloride with (2) cobaltous octoate, the mole ratio of component (1) to component (2) being from 1:1 to 50:1, said component (1) being used in an amount of 1 to 100 gram millimoles per 100 grams of monomers, and said polymerization being carried out at a temperature of −100 to 250° F.

14. A process which comprises polymerizing isoprene with 1,2-epoxypropane in hydrocarbon diluent using, as catalyst, the composition which forms on mixing (1) ethylaluminum sesquichloride with (2) the reaction product of cobaltous chloride and an N,N-dimethylamide derived from a mixture of $C_6$ to $C_{12}$ fatty acids, the mole ratio of component (1) to component (2) being from 1:1 to 50:1, said component (1) being used in an amount of 1 to 100 gram millimoles per 100 grams of monomers, and said polymerization being carried out at a temperature of −100 to 250° F.

15. A process which comprises polymerizing acrylonitrile with 1,2-epoxypropane in hydrocarbon diluent using, as catalyst, the composition which forms on mixing (1) triisobutylaluminum with (2) the reaction product of cobaltous chloride and an N,N-dimethylamide derived from a mixture of $C_6$ to $C_{12}$ fatty acids, the mole ratio of component (1) to component (2) being from 1:1 to 50:1, said component (1) being used in an amount of 1 to 100 gram millimoles per 100 grams of monomers, and said polymerization being carried out at a temperature of $-100$ to $250°$ F.

16. A process which comprises polymerizing acrylonitrile with 1,2-epoxypropane in hydrocarbon diluent using, as catalyst, the composition which forms on mixing (1) triisobutylaluminum with (2) the reaction product of ferrous chloride and an N,N-dimethylamide derived from a mixture of $C_6$ to $C_{12}$ fatty acids, the mole ratio of component (1) to component (2) being from 1:1 to 50:1, said component (1) being used in an amount of 1 to 100 gram millimoles per 100 grams of monomers, and said polymerization being carried out at a temperature of $-100$ to $250°$ F.

17. A process which comprises polymerizing isobutene with 1,2-epoxypropane in hydrocarbon diluent using, as catalyst, the composition which forms on mixing (1) triisobutylaluminum with (2) the reaction product of cobaltous chloride and an N,N-dimethylamide derived from a mixture of $C_6$ to $C_{12}$ fatty acids, the mole ratio of component (1) to component (2) being from 1:1 to 50:1, said component (1) being used in an amount of 1 to 100 gram millimoles per 100 grams of monomers, and said polymerization being carried out at a temperature of $-100$ to $250°$ F.

18. A process which comprises polymerizing isobutene with 1,2-epoxypropane in hydrocarbon diluent using, as catalyst, the composition which forms on mixing (1) triisobutylaluminum with (2) the reaction product of molybdenum pentachloride and an N,N-dimethylamide derived from a mixture of $C_6$ to $C_{12}$ fatty acids, the mole ratio of component (1) to component (2) being from 1:1 to 50:1, said component (1) being used in an amount of 1 to 100 gram millimoles per 100 grams of monomers, and said polymerization being carried out at a temperature of $-100$ to $250°$ F.

References Cited
UNITED STATES PATENTS 3,362,918　1/1968　Childers _____ 260—94.3

HARRY WONG, Jr., Primary Examiner

U.S. Cl. X.R.

260—32.8, 33.4, 79.5, 92.3, 93.7, 94.3, 94.8, 94.9, 465.6, 615